United States Patent [19]

Uno et al.

[11] 4,140,677

[45] Feb. 20, 1979

[54] SHAPED ARTICLE OF POLYMERS PREPARED FROM (β-HYDROXYETHYL)-TRIMELLITIC ACID IMIDE

[75] Inventors: Keiichi Uno; Hikoichi Nagano; Tsuyoshi Hongo; Takahito Miyagawa; Koichi Matsunami, all of Otsu, Japan

[73] Assignee: Toyo Boseki Kabushiki Kaisha, Osaka, Japan

[21] Appl. No.: 805,483

[22] Filed: Jun. 10, 1977

[30] Foreign Application Priority Data

Jun. 11, 1976 [JP] Japan .................. 51-68919

[51] Int. Cl.$^2$ ............................................ C08G 73/16
[52] U.S. Cl. .................. 528/322; 264/289; 264/290 T; 528/502
[58] Field of Search .......... 260/75 N, 78 TF, 78.3 R; 428/474, 35, 334; 264/289, 290

[56] References Cited
U.S. PATENT DOCUMENTS

| | | | |
|---|---|---|---|
| 3,060,191 | 10/1962 | Kolb et al. | 260/326 |
| 3,733,302 | 5/1973 | Klebe et al. | 260/47 ET |
| 3,880,812 | 4/1975 | Golinkin et al. | 260/78.3 R |
| 4,070,524 | 1/1978 | Keske | 428/383 |

*Primary Examiner*—Lester L. Lee
*Attorney, Agent, or Firm*—Jones, Tullar & Cooper

[57] ABSTRACT

A shaped article having a refractive index of not less than 1.625 at least in one direction and possessing excellent physical properties and various uses, which can be prepared by stretching a molded product, which is made of a polymeric material comprising at least 80 mol% of the repeating units of the formula:

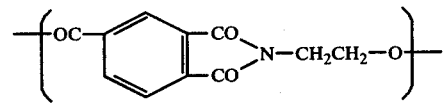

and having an intrinsic viscosity of not less than 0.25 dl/g when measured in a mixture of phenol and sym.-tetrachloroethane in a weight ratio of 6 : 4 at 30° C. and has a refractive index of not more than 1.610 at least in one direction, at a temperature of 120° to 230° C. with a stretch ratio of 2 to 20 in the same direction as the refractive index is measured, or by melt extruding the polymeric material at a temperature higher than 230° C. and not higher than 360° C. while or immediately followed by stretching with a deformation speed of not less than 20 times the speed of the melt extrusion.

11 Claims, 5 Drawing Figures

Fig. 1 (Direction of X-rays irradiated)
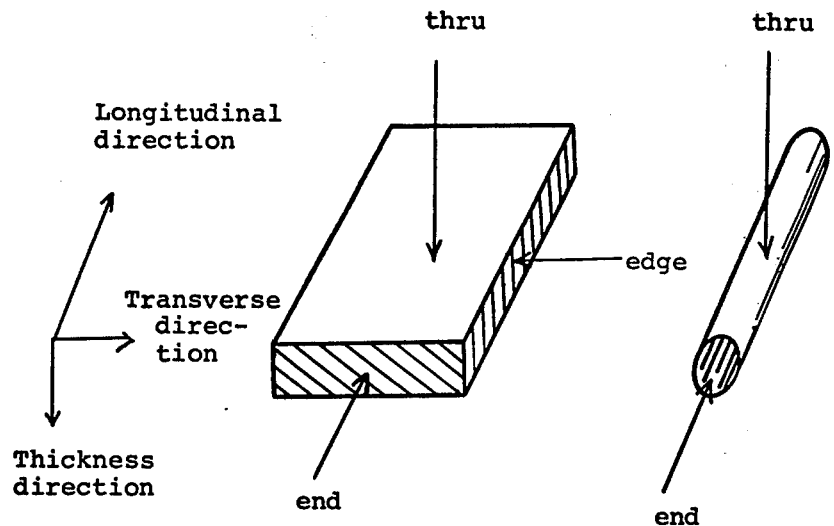
Film
Fiber
Fig. 2 (X-ray diffraction pattern)
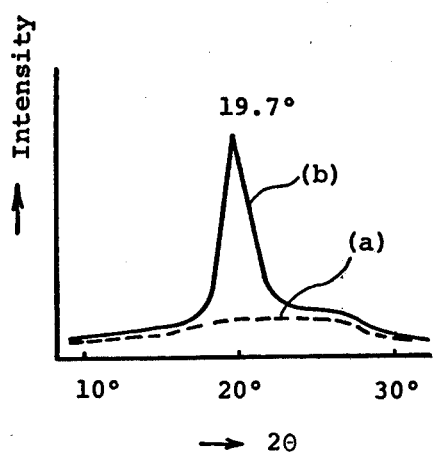
Fig. 3 (X-ray diffraction pattern)
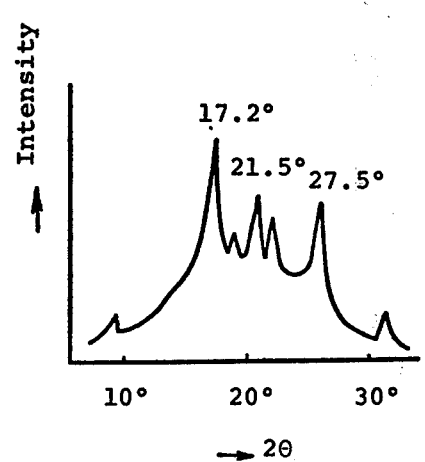

Fig. 4 (X-ray diffraction along Debye's ring)
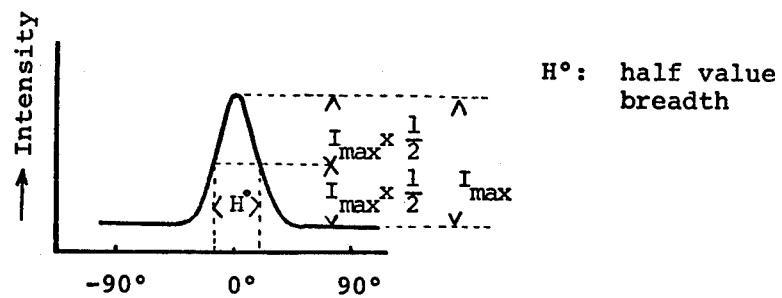
$H°$: half value breadth
Fig. 5 (X-ray diffraction pattern)
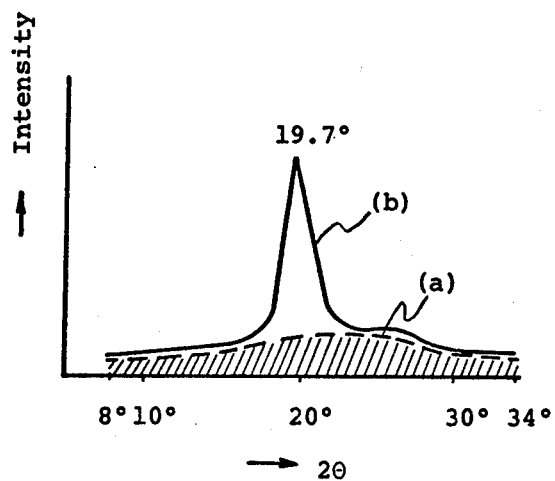

SHAPED ARTICLE OF POLYMERS PREPARED FROM (β-HYDROXYETHYL)-TRIMELLITIC ACID IMIDE

DETAILED DESCRIPTION OF THE INVENTION

The present invention relates to a shaped article and its manufacture. More particularly, it relates to a shaped article made of a polymeric material comprising as the main constituent the repeating units originated from N-(β-hydroxyethyl)-trimellitic acid imide, which can be manufactured by melt molding and have excellent physical properties such as high thermal resistance and high size stability, and its manufacture.

As is well known, polyesters obtained by the reaction between aromatic dicarboxylic acids and diols are used for the manufacture of shaped articles such as fibers, films, non-woven fabrics and bottles. Particularly, polyethylene terephthalate is suitable for such use. This is, on one hand, due to its excellent properties in mechanical strength, thermal resistance, chemical resistance, size stability and the like and, on the other hand, due to the adoptability of melt polymerization for its production and of melt molding for its shaped article is quite suitable for mass production. However, the technical progress in recent days requires the appearance of shaped articles having more excellent properties than polyethylene terephthalate. For instance, in the field of tire cords, the need to cords of polymeric materials usable under drastic conditions instead of steel cords is present. Further, for instance, the need to films of polymeric materials usable at high temperatures such as 155° C. is present in the field of electric insulation. Furthermore, for instance, the need to films of polymeric materials having high strength and high modulus with good size stability exists in the field of magnetic recording tape. While these needs are partly filled by the appearance of some specific polymeric fibers and films (e.g. "Kevlar", "Nomex", "Kapton"), there is a common drawback to these shaped articles in melt polymerization and/or melt molding being not adoptable for their production or manufacture. Thus, the procedure and operation for polymerization and/or molding in their production or manufacture are complex so that their product cost is high.

As the result of the extensive study, it has now been found that a shaped article having a refractive index of not less than 1.625 at least in one direction can be manufactured from poly(N-ethylenetrimellitate imide) (hereinafter referred to as "PETI"). It has also found that the shaped article made of PETI and having the said refractive index is superior to conventional shaped articles made of thermoplastic materials in various properties including thermal resistance, size stability and mechanical strength. Since PETI is producible by melt polymerization and can be shaped by melt molding, its shaped article is quite suitable for industrial production or manufacture.

In U.S. Pat. No. 3,060,191, it is disclosed that PETI melts at 200° C., and the melt can be molded into filaments. However, the thus obtained filaments are brittle, the intrinsic viscosity being only about 0.15 dl/g, and insufficient in thermal resistance. U.S. Pat. No. 3,880,812 discloses self-supporting films, coatings and injection-molded products made of PETI having a higher degree of polymerization than that of PETI as described in U.S. Pat. No. 3,060,191. But, they are also brittle, the strength at break being about 4 to 11 kg/mm$^2$ and the elongation at break being about 2.5 to 4.5%. Therefore, it is not possible to use them in the field where a high mechanical strength is required, for instance, as ropes, tire cords, fishing nets, magnetic recording tapes, packaging materials, etc.

The shaped article of the present invention is entirely different from the shaped products of PETI as disclosed in the said U.S. patents in micro-structure, and in fact, clear differences are seen between them in refractive index, density, degree of oriented crystallinity, etc. Particularly notable is that the shaped article of the invention having a certain refractive index show excellent physical properties such as high thermal resistance, high size stability and high mechanical strength, which are not seen in the conventional shaped products of PETI.

The shaped article of this invention is made of a polymeric material comprising at least 80 mol% of the repeating units of the formula:

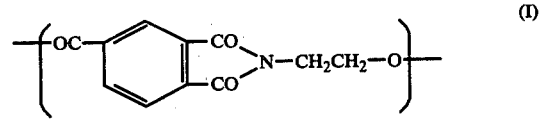

and having an intrinsic viscosity of not less than 0.25 dl/g when measured in a mixture of phenol and sym.-tetrachloroethane in a weight ratio of 6 : 4 at 30° C and has a refractive index of not less than 1.625 at least in one direction.

One of the characteristics of the shaped article of the invention is to have a refractive index of not less than 1.625, usually not more than 1.710 at least in one direction. Such high refractive index as has never been possessed by conventional shaped products of PETI suggests that the shaped article of the invention has a certain specific novel micro-structure, which may contribute in improvement of the physical properties. For instance, a film of PETI as disclosed in U.S. Pat. No. 3,880,812 has a refractive index of about 1.605 in both the longitudinal and transverse directions on the film surface. To the contrary, the shaped article of the invention possesses a refractive index of 1.625 or more at least in one direction. The refractive indexes and the strength and elongation at break at 20° C. in the same direction as in the determination of the refractive index of these films are shown in the following table (PETI having an intrinsic viscosity of 0.540 dl/g being employed).

|  | Refractive index | Strength at break (kg/mm$^2$) | Elongation at break (%) |
|---|---|---|---|
| Film of U.S. Pat. No. 3,880,812 | 1.605 | 10 | 8.9 |
| Film of the invention | 1.665 | 32 | 11.8 |
| Film of the invention | 1.700 | 44 | 11.5 |

Thus, the micro-structural feature of the shaped article of the invention affords excellent mechanical properties.

Further, the fibers and films as the examples of the shaped article of the invention show the following tensile properties when measured at 20° C. under a relative humidity of 65% according to the procedure as hereinafter described:

Tensile strength at break (kg/mm$^2$): 15 to 150 (usually 15 to 50);
Elongation at break (%): 1 to 200 (usually 1 to 100);
Young's modulus (kg/mm$^2$): 300 to 3,000 (usually 400 to 2,000).

Furthermore, the shaped article of the invention shows an excellent impact resistance and a high endurance to repeated stressing. For instance, the shaped article in a filmy or hollow body form affords the following values when measured at 20° C under a relative humidity of 65% according to the procedure as hereinafter described:

Impact strength (kg.cm/25 μ): 5 to 20;
MIT folding endurance (times): 10,000 to 200,000.

The shaped article of the invention, for instance, in a fibrous, filmy or hollow body form usually has a refractive index of not less than 1.625 at least in one direction and a density of not less than 1.430 g/cm$^3$, usually of not more than 1.460 g/cm$^3$, while conventional shaped products of PETI show a refractive index of about 1.605 and a density of about 1.420 g/cm$^3$. This fact shows apparently that the shaped article of the invention possesses a denser micro-structure which has never been seen in conventional shaped products of PETI.

The difference between the shaped article of the invention and a conventional shaped product of PETI may be more clearly understood from the X-ray analysis. Thus, when the X-ray diffractometry is effected by the aid of Rota Flex RU-3 H (manufactured by Rigaku Denki Kabushiki Kaisha) with the irradiation of the X-rays (Cu-Kα rays) from the direction of thru as shown in FIG. 1 of the accompanying drawings, which is for illustration of the direction of X-rays irradiated, the PETI film (density, 1.420 g/m$^3$) prepared by g/cm the method as disclosed in U.S. Pat. No. 3,880,812 affords the diffraction curve (a) on the equator as shown in FIG. 2, while the film of the invention (density, 1,448 g/cm$^3$) prepared by stretching a film in strip in the longitudinal direction while keeping the transverse direction free affords the diffraction curve (b) on the equator as shown in FIG. 2. For comparison, the X-ray diffraction curve by the powder method of PETI obtained by solid state polymerization is indicated in FIG. 3, the said curve corresponding to the X-ray pattern of the polymeric material before film forming.

On observation of the above X-ray diffraction patterns, it may be first noted that, in the curve (b), the most intense diffraction peak appears at 2 θ of 19° to 21°. This peak is quite characteristic to the shaped article of the invention. It may be also noted that the comparison of the curves (a) and (b) reveals that the PETI film of U.S. Pat. No. 3,880,812 is substantially amorphous, whereas the film of the invention is apparently crystallized. Furthermore, it is noted that the micro-crystals of the film of the invention is oriented as understood from the comparison with the diffraction pattern in FIG. 3. Moreover, the half value breadth H° is obtained from the curve (b) in FIG. 2 according to the method as indicated in FIG. 4, and the degree of orientation is calculated according to the following equation:

$$\text{Degree of orientation} = \frac{180° - H°}{180°}$$

whereby a value of 0.97 is obtained.

Thus, the shaped article of the invention shows a high degree of orientation, which proves that the micro-crystals are surely oriented. From the area under the curve (b) in FIG. 2 and the area under the curve based on the scattering of the non-crystallized part (similar to the curve (a)), the degree of oriented crystallinity (hereinafter referred to as "DOC") is calculated to be 39%. The favorable shaped article of the invention is the one having a DOC of 10 to 50%.

It is thus confirmed that the micro-structure inherently and characteristically present in the shaped article of the invention having a high density is an oriented crystalline structure as never seen in conventional shaped products of PETI. The highly superior thermal resistance of the shaped article of the invention in comparison with conventional shaped products of PETI is, in a great part, based on this novel micro-structure (oriented crystal line structure). The following table shows the comparison of the thermal resistances as the mechanical properties at 150° C. of the films prepared from PETI having an intrinsic viscosity of 0.540 dl/g (the resin being pressed by the aid of a heat press at 300° C. under a pressure of 100 kg/cm$^2$ and then cooled to obtain a press film having a thickness of 100 microns which is monoaxially stretched with free width and with a stretch ratio of 5 at 190° C.):

|  | Refractive index | Density (g/cm$^3$) | Strength and elongation at break at 150° C. | |
|---|---|---|---|---|
|  |  |  | Strength (kg/mm$^2$) | Elongation (%) |
| Film of U.S.* Pat. No. 3,880,812 | 1.605 | 1.420 | 2.1 | 66 |
| Film of the* invention | 1.700 | 1.448 | 35.0 | 5.6 |
| Biaxially stretched film of polyethylene terephthalate** |  |  | 8.4 | 126 |

Note:
*Strength and elongation a break measured in the direction as the refractive index is measured.
**Strength and elongation at break measured in the longitudinal direction.

The stretched product of the invention possesses an excellent thermal resistance, the rate of maintenance of strength at break at 150° C. (to 20° C.) being 60% or more (in case of the density being 1.430 g/cm$^3$ or more).

Thus, the excellent thermal resistance of the shaped article of the invention is based on its novel physical structure. From the above table, it is also understood that the shaped article of the invention is highly superior in the thermal resistance to the commercially available, biaxially stretched film of polyethylene terephthalate having an approximately equal melting point to that of the shaped article of the invention.

The shaped article of the invention has usually a tensile strength at break of 5 to 50 kg/mm$^2$ and an elongation at break of 3 to 300% at 150° C. It is entirely of surprising nature that the shaped product of a thermoplastic polymer which is capable of being melt molded shows such excellent mechanical properties as above at an elevated temperature, since those have never been achieved by conventional shaped products made of polyesters such as polyethylene terephthalate or made of PETI as disclosed in the said U.S. patents.

As mentioned above, the shaped articles of the invention are quite different from the conventional ones in their physical structures in which the PETI molecules are arranged regularly and densely. Because of this structure, the shaped article of the invention is excellent in mechanical properties such as strength and Young's modulus, thermal resistance, hydrolysis resistant property, chemical resistance, gas-permeation preventing property, etc. Such excellent physical properties bring about a great industrial value, making it possible to utilize the shaped articles of the invention for the uses for which conventional products are difficult to be employed, i.e. tire codes, magnetic tapes, insulating films (or clothes), packaging films, bottles, etc.

The polymeric material to be used in the manufacture of the shaped article of the present invention comprises at least 80 mol%, preferably at least 90 mol%, of the repeating units of the formula (I) and can be produced, for instance, by subjecting at least one of N-(β-hydroxyethyl)-trimellitic acid imide and its derivatives of the formula:

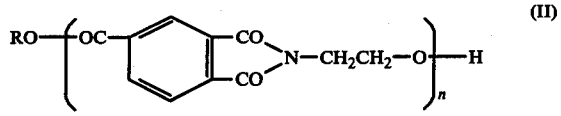

wherein R is a hydrogen atom or an ester residue such as a $C_1-C_{20}$ alkyl group optionally bearing one benzene ring or one hydroxyl group or a phenyl group optionally bearing one or more substituents selected from the group consisting of alkyl, nitro and halogen and $n$ is a number of not less than 1 ($n$ representing an average number and being not necessarily required to be an integer), or a mixture of at least one of them with at least one of other compounds copolymerizable with them to melt polymerization or solid phase polymerization in the presence of an ester exchange catalyst or a polycondensation catalyst conventionally employed for the production of polyesters in a per se conventional manner.

Examples of the copolymerizable compounds are amino acids (e.g. aminoacetic acid, aminohexanoic acid, aminobenzoic acid), lactams (e.g. caprolactam), lactones (e.g. β-propiolactone, caprolactone), hydroxycarboxylic acids (e.g. salicylic acid, glycollic acid), half esters of dicarboxylic acids with glycols (e.g. half ester of ethylene glycol with maleic acid), etc.

The polymeric material may comprise the polymer(s) as prepared above alone or in combination. Also, the polymeric material may comprise any other polymer(s) in addition to the above prepared polymer(s). Examples of the other polymers are polyesters (including polyarylene esters), polycarbonates, nylons, polysulfones, polyphenylene oxide, polyethylene, polystyrene, polymethylpentene-1, polyorganic siloxanes, thermoplastic fluorine-containing polymers, etc. In any event, the content of the repeating units of the formula (I) in the polymeric material is kept to be not less than 80 mol%.

The polymeric material is required to have an intrinsic viscosity of not less than 0.25 dl/g, preferably not less than 0.5 dl/g. When the intrinsic viscosity is less than 0.25 dl/g, the ultimately obtained shaped article is brittle. For easy molding, the intrinsic viscosity of the polymeric material is desirable to be not more than 1.5 dl/g.

In addition to the said requirement on the intrinsic viscosity, the polymeric material is preferred to have a low carboxyl group content, particularly of not more than 70 equivalents per $10^6$ g, in view of the advantages that the lowering of the molecular weight or the intrinsic viscosity on the melt molding is small (usually the lowering of the intrinsic viscosity being not more than 15%) and the resistance to the deterioration due to the hydrolysis is large. For instance, the pressed films prepared by pulverizing PETI having an intrinsic viscosity of 0.570 dl/g and a carboxyl group content of 42 equivalents per $10^6$ g and PETI having an intrinsic viscosity of 0.565 dl/g and a carboxyl group content of 80 equivalents per $10^6$ g, both of which contain potassium titanyl oxalate in a concentration of 0.02 mol%, to particles of less than 30 mesh, drying the resulting particles in vacuo and pressing the dried particles at 300° C. for 5 minutes show intrinsic viscosities of 0.513 dl/g and 0.401 dl/g, respectively.

On the manufacture of the shaped article, the polymeric material may be incorporated with any additive conventionally employed for the production of molded products. Examples of the additive are stabilizers such as phosphoric acid and phosphorous acid, and their esters and metal salts, delustering agents such as titanium oxide, lubricants such as finely powdered silica and clay, antioxidants, plasticizers, antistatic agents, dyestuffs, pigments, ultraviolet ray absorbers, reinforcing materials such as carbon black, carbon fibers, glass fibers and synthetic fibers, etc.

For manufacture of the shaped article of the invention, the polymeric material is first molded in an appropriate form by a conventional procedure such as melt extrusion or casting. In case of melt extrusion, for instance, the polymeric material may be extruded in a melt state at a temperature higher than 230° C., and not higher than 360° C., by the aid of a conventional extruding machine such as a screw extruder or a gear pump and the extruded material is contacted with a cooling aid in a gaseous, liquid or solid state to obtain a molded product. The thus obtained molded product after cooling is amorphous as confirmed by the X-rays analysis and has a refractive index of not more than 1.610, usually from 1.500 to 1.610, at least in one direction. Normally, the density of the molded product is around 1.420 g/cm³.

Then, the molded product having a refractive index of not more than 1.610 is stretched at a temperature of 120° to 230° C., preferably of 170° to 210° C., in a stretch ratio of 2 to 20 in the same direction as the refractive index is measured to make a shaped article of which the refractive index in the stretching direction is not less than 1.625. When the temperature on stretching is lower than 120° C., the molded product is so brittle as can be hardly stretched. When the temperature is higher than 230° C., the effective alignment of the molecules is difficult, and a shaped article having a high refractive index as desired is not obtainable. A sufficient alignment of the molecules for obtainment of the shaped article having a high refractive index is also not attainable when the stretch ratio is less than 2. The stretching speed may be usually from 10 to 1,000,000%, although no particular limitation is present thereon.

For stretching, there may be adopted any optional method such as monoaxial stretching in which the molded product is stretched at least in one direction, biaxial stretching in which the molded product is stretched in two directions being vertial to each other or multiaxial stretching in which the molded product is stretched in multidirections by the use of a pressure medium such as a gas or a liquid. Stretching may be carried out in a single step or two or more steps. In case of biaxial stretching, it may be effected simultaneously or stepwise in two directions, and in case of stepwise biaxial stretching, it may be carried out first in a longitudinal direction and then in a transverse direction, or vice versa.

As the operation for stretching, there may be adopted various procedures. In case of fibers, roll stretching, pin stretching, hot plate stretching, etc. are preferable. In case of films and sheets, roll stretching, tenter stretching, inflation stretching, calender rolling, etc. are preferred. Other conventional procedures such as deep draw molding and stretching bottle molding may be also applicable to the manufacture of the shaped article of the invention.

Alternatively, the molded product in the course of cooling, which still has a temperature about 120° to 230° C., may be cooled while applying a stretching force thereto so as to stretch the same in a stretch ratio of 2 to 20, whereby a shaped article having a refractive index of not less than 1.625 at least in one direction is obtainable without any separate step for stretching.

Alternatively, the shaped article of the invention may be manufactured directly from the polymeric material without the intermediate production of the molded product, for instance, by melt extruding the polymeric material at a temperature higher than 230° C., and not higher than 360° C., while or immediately followed by stretching with a deformation speed of not less than 20 times the speed of the melt extrusion, and cooling the stretched product to a temperature of from 10° to 100° C. In case of fibers, a conventional apparatus and technique as employed in a high speed melt spinning method for production of polyester fibers and nylon fibers (take-up speed, 2,000 m/min or more) may be applied. In case of films, a conventional melt extrusion-T-die method in which the rotation speed of the cooling roll is increased or a conventional melt extrusion-inflation method in which the speed of the nip roll is increased may be adopted under the conditions of the melting temperature higher than 230° C., and not higher than 360° C., the proportion of the die extrusion speed to the take-up speed of 1 : 20 or more, particularly of 1 : 50 – 200, and the cooling temperature of 10° to 100° C.

As the result of the stretching under the conditions as stated above, there is obtained a shaped article having a refractive index of not less than 1.625 at least in one direction. Such shaped article also may have a high density (i.e. a high degree of crystallization), and its density can be made higher by application of heat treatment thereto. The heat treatment may be effected at a temperature higher than the temperature at stretching and lower than the melting point of the shaped article for a period of several seconds to several hours, if necessary, under a tension or in a relaxed state of not more than 20% to the final length. This heat treatment is also effective in enhancing the size stability of the shaped article.

The shaped article of the invention may be in any form including fibrous articles (e.g. fibers, woven fabrics, non-woven fabrics), filmy articles (e.g. films, sheets), and hollow articles (e.g. deep formings, bottles, tubes, pipes). Usually, fibrous articles have a diameter of 0.03 micron to 5 mm, filmy articles have a thickness of 1 micron to 5 mm and hollow articles have a film thickness of 1 micron to 5 mm.

When desired, the shaped article may be combined with any other shaped article by a per se conventional procedure. For instance, in case of the shaped article being a film or a sheet, it may be layered on a resinous plate or a metal foil depending on the use. In case of the shaped article being a fiber, it may be used for preparation of a hollow fiber or a conjugate fiber (e.g. side-by-side fiber, sheath-core fiber).

The shaped article thus prepared is excellent in refractive index, Young's modulus, strength, size stability, thermal resistance, solvent-resistance, chemical resistance, gas barrier property, radioactive ray-resistant property, weather-resistance, dyeable property, self fire-extinguishing property, etc. It can be effectively utilized in the form of fibers, films, tapes, bottles, deep draw molded products, tubes, pipes and other shapes for a variety of uses such as optical fibers, tire cords, ropes, fishing nets, paddings for belts, tents, carpets, fire-fighting clothes, magnetic tapes, insulating films, films for condensers, metallized threads, flexible print wiring base plate, tracing films, adhesive tapes, strings for binding, films for packaging foods, shrinking films, packaging materials for retorts, films for agricultural uses, films for thermic ray-interception, films for X-ray-interception, packaging materials for machine parts, balloons, bottles for foods and cosmetics, blister packs for medicines, tubes, pipes for electrical insulation and medical use, general clothes, building materials, etc.

Practical and presently preferred embodiments of the invention are illustratively shown in the following Examples in which the physical properties are measured by the following methods:

(1) Intrinsic viscosity:

The specimen (100 mg) is dissolved in a mixture of phenol and sym.-tetrachloroethane (6 : 4 by weight ratio) (25 ml), and measurement is carried out by the use of an Ubbelohde's viscometer at a temperature of 30° C.

(2) Melting point:

Measurement is effected on the specimen (10 mg) by the use of a Perkin Elmer's differential scanning calorimeter with a temperature-elevating velocity of 20° C. per minute, and the temperature giving an endothermic peak is recorded. Sensitivity, 8 mcal/sec.

(3) Glass transition temperature:

Measurement of tan δ is effected using a Rheo-Vibron "DDV-II B" manufactured by Toyo Sokki K.K. with a frequency of 110 Hz under a temperature-elevating velocity of about 1° C. per minute. The temperature at which the curve of tan δ — temperature rises is taken as the glass transition temperature.

(4) X-ray diffractometry:

(a) Degree of orientation. Measurement is effected by the use of an apparatus for X-ray diffractometry "Rota-Flex RU-3 H" manufactured by K. K. Denki K.K. with Cu-Kα rays as the X-rays and an X-ray tube of 70 mA-45 KV. The scanning velocity in the equatorial plane is 1 grade per minute at 2 θ, and that in the circumferential direction along the Debye ring is 8 grades per minute. The chart velocity is 1 cm per minute.

For a monoaxially oriented product, the X-ray diffraction curve on the equator is obtained by carrying out the irradiation of X-rays in the thru direction as shown in FIG. 1. In case of fibers, for instance, irradiation is made vertically to the fiber axis, and in case of films and bottles, irradiation is done vertically to their main plane. Then, the half-value breadth (i.e. H degree) of the strength distribution measured along the Debye's ring of the strongest diffraction peak in the diffraction curve is determined by the method as shown in FIG. 4, and the degree of orientation is calculated according to the following equation:

$$DOC\ (\%) = \frac{S - A}{S} \times 100$$

For a biaxially or multiaxially oriented product, the X-rays are irradiated from the three directions of thru, edge and end as shown in FIG. 1, and the same procedure and calculation as mentioned above are effected to obtain the degree of orientation.

(b) Degree of oriented crystallinity (DOC). The X-ray diffraction intensity curve on the equator is obtained by carrying out the irradiation of X-rays in the thru direction as shown in FIG. 1. In case of fibers, for instance, irradiation is done vertically to the fiber axis, and in case of films and bottles, irradiation is effected vertically to their main plane. Then, the integrated intensity of diffraction at Bragg angles of diffraction (2 $\theta$) of 8° to 34° (i.e. the area (S) below the X-ray diffraction intensity curve (b) and between Bragg angles of diffraction of 8° and 34° as shown in FIG. 5) and the integrated intensity of diffraction of the background due to the scattering of the amorphous part (i.e. the area (A) below the X-ray diffraction intensity curve (a) and between Bragg angles of diffraction of 8° and 34° as hatched in FIG. 5) are determined, and the DOC is calculated according to the following equation:

$$\text{Degree of orientation} = \frac{180° - H°}{180°}$$

(5) Refractive index:

Measurement is effected at a temperature of 20° C according to ASTM (American Society for Testing and Materials) D-542-50 by the use of an Abbe's refractometer manufactured by Atago Kogaku K.K. Methylene iodide is used as the contacting liquid. In the determination of the refractive indexes of fibers, films and the like, the following literatures are referred to: Kirk-Othmer: Encyclopedia of Chemical Technology, 2nd Ed., Vol. 17, p. 210, Interscience Publishers, a division of John Wiley & Sons, Inc., 1968; Katsumoto Atsuki et al.: Kogyo Kagaku Zasshi (J.Chem.Soc. Japan, Ind.Chem.-Soc.), 40, 793; Saburo Okajima et al.: Kogyo Kagaku Zasshi, 42, 810.

(6) Tensile properties:

Measurement is effected according to ASTM D-822-67 by the use of a tensile tester "Tensilon UTM-3" manufactured by Toyo Sokki K.K. at a temperature of 20° C. under a relative humidity of 65% or at a temperature of 150° C. The specimen length is 20 mm, and the test velocity is 10 mm per minute. The direction on measurement is the same as the stretching direction unless otherwise stated.

(7) MIT folding endurance:

Measurement is effected according to ASTM D-2176-69 in an atmosphere of 20° C. with a relative humidity of 65% under a load of 1 kg.

(8) Impact strength:

Measurement is effected by the use of a film impact tester manufactured by Toyo Seiki Seisakusho K.K. at a temperature of 20° C. under a relative humidity of 65%.

(9) Dielectric constant and dielectric dissipation factor:

Measurement is effected according to ASTM D-150-65T by the use of a precision capacitance bridge "GR 1620" manufactured by General Radio (U.S.A.) and an electrode "SE-30" manufactured by Ando Denki K.K. with a frequency of 1 KHz at a temperature of 20° C. under a relative humidity of 65%.

(10) Dielectric breakdown voltage:

Measurement is effected according to ASTM D-149-64 using a dielectric breakdown voltage tester manufactured by Minato Denki K.K., a brass-made lower electrode (plate) and an upper electrode (column, 25 $\phi$) with a frequency of 60 Hz at a temperature of 20° C. under a relative humidity of 65%.

(11) Clarity and haze:

Measurement is made according to ASTM D-1003-61 by the use of a haze meter S type manufactured by Toyo Seiki Seisakusho K.K.

(12) Degree of heat shrinkage:

The specimen is treated with the hot air of 150° C for 1 hour, and the rate of the change in size is recorded.

(13) Carboxyl group content:

Measurement is effected according to the H.A. Pohl's method (Analytical Chemistry, 26, 1614 (1954)), but the specimen is dissolved by adding benzyl alcohol (5 ml) to the specimen (0.2 g) in a vessel and heating the vessel at 215 ± 1° C. in an oil bath for 7 minutes under stirring. After taking out the resulting solution, benzyl alcohol (5 ml) is added to the vessel for rinsing, and the vessel is heated at 215 ± 1° C. for 3 minutes. The previously obtained solution and the rinsing solution are combined together and used for measurement. The results are indicated by [COOH] eg/$10^6$ g.

EXAMPLE 1

Poly(N-ethylenetrimellitate imide) having an intrinsic viscosity of 0.50 and a carboxyl group content of 50 eg/$10^6$ g is pressed by the aid of a heat press manufactured by Kamifuji Kinzoku Kogyo K.K. at a temperature of 300° C. for 3 minutes. The product is then cooled with water to obtain a pressed film having a thickness of 110 $\mu$. The intrinsic viscosity of the pressed film is 0.43, and its glass transition temperature is 151° C.

The pressed film is monoaxially stretched by the aid of a tenter with a stretch ratio of 3 and with free width at a temperature of 170° to 220° C. The physical properties of the stretched film is shown in Table 1, wherein the physical properties of the pressed film as obtained above and of a stretched film obtained by stretching the pressed film monoaxially at a temperature of 225° C. with a stretch ratio of 3 and with free width are also shown for comparison.

From Table 1, it is understood that the stretched films of the invention (i.e. Run Nos. 1 to 5) have a large density and a large refractive index in the stretching direction and show an extremely high strength in the same direction.

Table 1

| Run No. | Temp. at stretching (° C.) | Refractive index | | | Density (g/cm$^3$) | Strength at break (kg/mm$^2$) | | Degree of orientation |
| | | Stretching direction | Transverse direction | Thickness direction | | 20° C. | 150° C. | |
| --- | --- | --- | --- | --- | --- | --- | --- | --- |
| 1 | 170 | 1.700 | 1.589 | 1.574 | 1.438 | 32.1 | 24.3 | 0.93 |

Table 1-continued

| Run No. | Temp. at stretching (°C.) | Refractive index Stretching direction | Refractive index Transverse direction | Refractive index Thickness direction | Density (g/cm³) | Strength at break (kg/mm²) 20° C. | Strength at break (kg/mm²) 150° C. | Degree of orientation |
|---|---|---|---|---|---|---|---|---|
| 2 | 180 | 1.689 | 1.588 | 1.581 | 1.435 | 28.5 | 21.8 | 0.92 |
| 3 | 190 | 1.661 | 1.594 | 1.591 | 1.433 | 20.3 | 15.7 | 0.91 |
| 4 | 200 | 1.633 | 1.600 | 1.597 | 1.432 | 14.6 | 11.2 | 0.90 |
| 5 | 210 | 1.625 | 1.602 | 1.599 | 1.430 | 11.8 | 8.5 | 0.85 |
| A | 225 | 1.624 | 1.610 | 1.614 | 1.423 | 10.2 | 3.6 | 0.52 |
| B | Mere pressing (no stretching) | 1.605 | 1.605 | 1.605 | 1.420 | 5.6 | 2.2 | 0 |

EXAMPLE 2

Poly(N-ethylenetrimellitate imide) having an intrinsic viscosity of 0.25 or 0.43 is spun by the use of a flow tester "Koka type" manufactured by Shimadzu Seisakusho K.K. through a nozzle of 1 mm in hole diameter at a temperature of 255° or 270° C. to obtain an unstretched yarn of 45 to 96 μ in diameter. The glass transition temperature of the yarn is 150° C. irrespective of the intrinsic viscosity and the spinning temperature. The yarn is stretched with a stretch ratio of 2.5 at 165° C. or with a stretch ratio of 5 at 174° C. The physical properties of the stretched yarn thus obtained is shown in Table 2, wherein the physical properties of a stretched yarn obtained by stretching the unstretched yarn as obtained above with a stretch ratio of 1.3 at 165° C. or with a stretch ratio of 1.2 at 174° C. are also shown for comparison.

From Table 2, it is understood that the stretched yarns according to the invention (i.e. Run Nos. 6 and 7) show a high refractive index and a high density with excellent tensile properties.

Table 2

| Run No. Physical properties | 6 | 7 | C | D |
|---|---|---|---|---|
| Intrinsic viscosity (dl/g) | 0.25 | 0.43 | 0.25 | 0.43 |
| Temperature at spinning (°C.) | 255 | 270 | 255 | 270 |
| Temperature at stretching (°C.) | 165 | 174 | 165 | 174 |
| Stretch ratio (times) | 2.5 | 5.0 | 1.3 | 1.2 |
| Refractive index | 1.685 | 1.700 | 1.609 | 1.606 |
| Density (g/cm³) | 1.437 | 1.443 | 1.421 | 1.421 |
| Strength at break (kg/mm²)* 20° C. | 14.1–25.6 | 28.9–48.5 | 5.7–7.3 | 6.1–8.4 |
| 150° C. | 10.8–16.5 | 21.8–34.0 | 2.2–2.7 | 2.5–3.0 |
| Elongation at break (%)* 20° C. | 28–60 | 5–12 | 1.7–2.5 | 1.5–3.5 |
| 150° C. | 47–105 | 11–35 | 45–63 | 43–71 |
| Degree of orientation | 0.94 | 0.95 | 0.31 | 0.27 |
| DOC (%) | 26 | 33 | 5.2 | 3.8 |

Note:
*The ranges of the values obtained on 10 stretched yarns are given.

EXAMPLE 3

Using poly(N-ethylenetrimellitate imide) having an intrinsic viscosity of 0.64, a pressed film being 112 μ in thickness is produced in the same manner as in Example 1. The glass transition temperature of the pressed film is 152° C. The pressed film is stretched biaxially by the use of a film stretching machine manufactured by T. M. Long Co. first in the longitudinal direction with a stretch ratio of 3.5 at 175° C. under a deformation velocity of 5,000% per minute and then in the transverse direction with a stretch ratio of 3.2 at the same temperature under a deformation velocity of 1,000% per minute to obtain a biaxially stretched film being 11 μ in thickness and having a good transparency. The physical properties of the stretched film are shown in Table 3, wherein the physical properties of the pressed film as obtained above are also shown for comparison.

From Table 3, it is understood that the stretched film according to the invention (i.e. Run No. 8) is excellent in various physical properties.

Table 3

| Run No. | 8 Longitudinal direction | 8 Transverse direction | E Longitudinal direction | E Transverse direction |
|---|---|---|---|---|
| Physical properties | | | | |
| Density (g/cm³) | 1.434 | | 1.420 | |
| Refractive index | 1.645 | 1.640 | 1.605 | 1.605 |
| Strength at break (kg/mm²) 20° C. | 24.5 | 23.2 | 8.9 | 8.7 |
| 150° C. | 18.8 | 17.4 | 3.2 | 3.1 |
| Elongation at break (%) 20° C. | 53 | 78 | 7.5 | 7.5 |
| 150° C. | 137 | 163 | 68 | 66 |
| Young's modulus (kg/mm²) | 370 | 350 | 235 | 230 |
| MIT folding endurance (times) | 67,000 | 41,000 | 3 | 4 |
| Impact strength (kg.cm/25 μ) | 12.4 | | 0.26 | |
| Clarity (%) | 91 | | 85 | |
| Haze (%) | 1.7 | | 4.8 | |
| Dielectric breakdown voltage (V/25 μ) | 9,600 | | — | |
| Dielectric constant | 2.9 | | — | |
| Dielectric dissipation factor | 0.0030 | | — | |

EXAMPLE 4

Poly(N-ethylenetrimellitate imide) having an intrinsic viscosity of 0.92 and a melting point of 282° C., obtained by solid state polymerization, is melt extruded at 340° C. by the aid of a screw extruder (40 φmm in diameter) to obtain a pressed film of 240 μ in thickness. The glass transition temperature of the pressed film is 152° C. The pressed film is stretched first in the longitudinal direction with a stretch ratio of 3.0 at 180° C. by the use of a roll stretching machine and then in the transverse direction with a stretch ratio of 3.5 at 175° C. by the use of a tenter, followed by further stretching in the longitudinal direction with a stretch ratio of 1.6 at 185° C. by the aid of a roll. The resulting stretched film is heat set with a roll of 220° C. The physical properties of the thus obtained film are shown in Table 4, wherein the physical properties of the film not subjected to heat setting are also shown for comparison.

From Table 4, it is understood that the film subjected to heat setting are excellent in strength and elongation at break even at a high temperature of 150° C.

Table 4

| Run No. | 9 (heat set) | | 10 (not heat set) | |
|---|---|---|---|---|
| Physical properties | Longitudinal direction | Transverse direction | Longitudinal direction | Transverse direction |
| Density (g/cm³) | 1.448 | | 1.435 | |
| Refractive index | 1.693 | 1.652 | 1.700 | 1.663 |
| Strength at break (kg/mm²) | | | | |
| 20° C. | 36.2 | 27.4 | 37.4 | 29.5 |
| 150° C. | 25.3 | 19.4 | — | — |
| Elongation at break (%) | | | | |
| 20° C. | 21 | 46 | 27 | 51 |
| 150° C. | 54 | 68 | — | — |
| Young's modulus (kg/mm²) | 673 | 494 | 658 | 453 |
| Degree of heat shrinkage (%) | 2.7 | 2.3 | 38 | 27 |
| Thickness of film (μ) | 14 | | 14 | |

EXAMPLE 5

Using an injection molding machine, poly(N-ethylenetrimellitate imide) having an intrinsic viscosity of 0.61 is plasticated at 290° C. and molded into a parison of 30 mm in inner diameter, 100 mm in length and 3 mm in radial thickness. The parison is heated at 175° C., elongated 2.2 times in the lengthwise direction by the aid of a rod and inflated 3 times in the radial direction by blowing the air in under a pressure of 20 kg/cm² to mold a transparent bottle having a height of 220 mm, a maximum inner diameter of 90 mm and a radial thickness (in average) of 0.45 mm. The density of the bottle at the wall portion is 1.436 g/cm³. The refractive indexes in height direction, in circumferential direction and in thickness direction are 1.640, 1.673 and 1.585, respectively. The strength at break in height direction and in circumferential direction are 17 kg/mm² and 23 kg/mm², respectively. Thus, the product shows a sufficient orientation in the biaxial directions.

On the other hand, a bottle is molded using the same polymer as above by a conventional blow molding method. The density of the bottle at the wall portion is 1.420 g/cm³, the refractive indexes in all the three directions are approximately 1.605 and the strength at break are about 6 kg/mm² in both height and circumferential directions.

EXAMPLE 6

Using poly(N-ethylenetrimellitate imide) containing potassium titanyl oxalate in a concentration of 0.02 mol%, a biaxially stretched film is prepared according to the method as in Example 3. The stretched film is immersed in water accommodated in a stainless steel made beaker and subjected to heat treatment in a steam-pressurized vessel at 130° C. for 17 hours. Then, the resulting film is dried at 65° C. under atmospheric pressure for 2 hours and then at 135° C under a pressure of 1 mmHg for 16 hours. The thus dried film is subjected to measurement for strength at break at 20° C. under a relative humidity of 65%, and the retention of strength in comparison with the stretched film before heat treatment is shown in Table 5.

Table 5

| Run No. | Intrinsic viscosity (dl/g) | Carboxyl group content ([COOH]eq/10⁶g) | Retention of strength (%) |
|---|---|---|---|
| 11 | 0.482 | 30 | 97 |
| 12 | 0.445 | 120 | 85 |

EXAMPLE 7

The pressed film as obtained in Example 3 is simultaneously stretched 3 times in both the longitudinal direction and the transverse direction by the use of a film stretching machine manufactured by T. M. Long Co. at a temperature of 185° C. with a deformation speed of 1,000%/min to make a biaxially stretched film being 13 μ in thickness and having a good transparency.

The physical properties of the stretched film and of the pressed film before stretching are shown in Table 6.

Table 6

| Run No. | 13 | | F | |
|---|---|---|---|---|
| Physical properties | Longitudinal direction | Transverse direction | Longitudinal direction | Transverse direction |
| Density (g/cm³) | 1.428 | | 1.420 | |
| Refractive index | 1.637 | 1.638 | 1.605 | 1.605 |
| Strength at break (kg/mm²) | 16.4 | 16.7 | 8.9 | 8.7 |
| Elongation at break (%) | 62 | 60 | 7.5 | 7.5 |
| MIT folding endurance (times) | 53,000 | 51,000 | 3 | 4 |
| Clarity (%) | 91 | | 85 | |
| Haze (%) | 1.8 | | 4.8 | |

What is claimed is:

1. A shaped article, which is made of a polymeric material comprising at least 80 mol % of the repeating units of the formula:

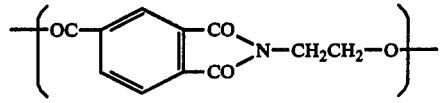

and having
(a) an intrinsic viscosity of not less than 0.25 dl/g when measured in a mixture of phenol and sym.-tetrachloroethane in a weight ratio of 6:4 at 30° C,
(b) a refractive index of not less than 1.625 at least in one direction,
(c) a density of not less than 1.430 g/cm³, and
(d) the following physical values at 20° C. in the direction in which the refractive index is measured:
  (i) a tensile strength at break of 15 to 150 kg/mm²
  (ii) a Young's Modulus of 300 to 3,000 kg/mm², and
  (iii) an elongation of 1–200%.

2. The shaped article according to claim 1, which has a degree of oriented crystallinity of not less than 10% with respect to the X-ray diffraction pattern obtained by irradiating the X-rays from the direction in a right angle to the direction in which the refractive index is measured.

3. The shaped article according to claim 1, which has the following physical values at 150° C. in the direction in which the refractive index is measured:
   Tensile strength at break = 5 to 50 kg/mm$^2$;
   Elongation = 3 to 300%.

4. The shaped article according to claim 1, wherein the polymeric material has a carboxyl group content of not more than 70 equivalents per 10$^6$ g.

5. The shaped article according to claim 1, wherein the intrinsic viscosity of the polymeric material is from 0.3 to 0.8 dl/g.

6. The shaped article according to claim 1, which is in a fibrous form.

7. The shaped article according to claim 1, which is in the form of fiber having a diameter of 0.1 micron to 5 mm.

8. The shaped article according to claim 1, which is in a filmy form.

9. The shaped article according to claim 8, which is in the form of film having a thickness of 1 micron to 5 mm.

10. The shaped article according to claim 1, which is in a hollow body form.

11. The shaped article according to claim 10, which is in the form of hollow body having a film thickness of 1 micron to 5 mm.

* * * * *

UNITED STATES PATENT OFFICE
CERTIFICATE OF CORRECTION

PATENT NO. : 4,140,677

DATED : February 20, 1979

INVENTOR(S) : Keiichi Uno; Hikoichi Nagano; Tsuyoshi Hongo; Takahito Miyagawa; Koichi Matsunami It is certified that error appears in the above-identified patent and that said Letters Patent are hereby corrected as shown below:

In Claim 7, the dependency on "Claim 1" should read --Claim 6--.

Signed and Sealed this

Fifteenth Day of May 1979

[SEAL]

Attest:

RUTH C. MASON
Attesting Officer

DONALD W. BANNER
Commissioner of Patents and Trademarks